US012529008B2

(12) United States Patent
Marin et al.

(10) Patent No.: US 12,529,008 B2
(45) Date of Patent: Jan. 20, 2026

(54) NATURAL SEMI-SOLID PERFUME

(71) Applicant: EXPRESSIONS PARFUMEES, Grasse (FR)

(72) Inventors: Christophe Marin, Nice (FR); Jennifer Buzzi, Grasse (FR); Juliette Sery, Antibes (FR)

(73) Assignee: EXPRESSIONS PARFUMEES, Grasse (FR)

( * ) Notice: Subject to any disclaimer, the term of this patent is extended or adjusted under 35 U.S.C. 154(b) by 847 days.

(21) Appl. No.: 17/786,134

(22) PCT Filed: Dec. 18, 2020

(86) PCT No.: PCT/EP2020/086947
§ 371 (c)(1),
(2) Date: Jun. 16, 2022

(87) PCT Pub. No.: WO2021/123110
PCT Pub. Date: Jun. 24, 2021

(65) Prior Publication Data
US 2023/0043162 A1  Feb. 9, 2023

(30) Foreign Application Priority Data
Dec. 20, 2019  (FR) .................................... 1915175

(51) Int. Cl.
| C11B 9/00 | (2006.01) |
| A61K 8/02 | (2006.01) |
| A61K 8/37 | (2006.01) |
| A61L 9/012 | (2006.01) |
| A61Q 13/00 | (2006.01) |

(52) U.S. Cl.
CPC .............. *C11B 9/00* (2013.01); *A61K 8/0216* (2013.01); *A61K 8/37* (2013.01); *A61K 8/375* (2013.01); *A61L 9/012* (2013.01); *A61Q 13/00* (2013.01); *A61K 2800/30* (2013.01); *A61K 2800/34* (2013.01)

(58) Field of Classification Search
CPC ...... A61K 8/375; A61K 8/0216; A61K 8/042; A61K 8/37; A61K 2800/34; A61K 2800/30; A61Q 15/00; A61Q 13/00; C11B 9/00; C11B 9/0019; C11B 9/0034; C11B 9/0073; C11B 9/0015; A61L 9/04; A61L 9/012
USPC ......................................................... 512/4, 1
See application file for complete search history.

(56) References Cited

U.S. PATENT DOCUMENTS

| 5,587,152 A | 12/1996 | Mackles et al. |
| 2006/0110415 A1* | 5/2006 | Gupta .................. A61K 8/0212 424/59 |
| 2012/0177589 A1 | 7/2012 | Banowski et al. |

FOREIGN PATENT DOCUMENTS

JP    H11332969 A    12/1999

OTHER PUBLICATIONS

Anonymous, "Eau de Parfum in a Glow Stick," Jul. 22, 2019, retrieved from www.gnpd.com, abstract No. Database accession No. 6717233.
International Search Report issued in corresponding International Application No. PCT/EP2020/086947, dated Mar. 4, 2021, pp. 1-6, European Patent Office, Rijswijk, Netherlands.

* cited by examiner

*Primary Examiner* — Jessica Whiteley
(74) *Attorney, Agent, or Firm* — HAUPTMAN HAM, LLP

(57) ABSTRACT

A perfumed composition in a solid or semi-solid form, where the composition includes from 5 to 40% by weight of the total weight of the perfume composition, and from 10 to 15% by weight of the total weight of the trihydroxystearin composition. The composition includes a solvent, preferably triethyl citrate. One or more embodiments relate to the field of perfumes and perfumed compositions. It finds advantageous application in the field of fine perfumery, cosmetics, hygiene products to be rinsed off or not, and home fragrances or indoor deodorisers or air fresheners.

14 Claims, No Drawings

NATURAL SEMI-SOLID PERFUME

The present application is a U.S. National Phase of International Application Number PCT/EP2020/086947, filed Dec. 18, 2020, which claims priority to French Application No. 1915175, filed Dec. 20, 2019, the entirety of each of which are incorporated herein by reference.

TECHNICAL FIELD OF THE INVENTION

The present invention relates to the field of perfumes and perfumed compositions. It finds particularly advantageous application in the field of fine perfumery, cosmetics, hygiene products to be rinsed off or not, and home fragrances or indoor deodorisers or air fresheners.

PRIOR ART

As consumers are constantly looking for new sensory experiences, the Fine Perfume category has seen many developments around gestures. The aim is to replace the classic alcoholic eau de toilette to be applied as a spray. In addition, the use of ethanol in cosmetic products has many drawbacks such as its irritating and drying natures.

Thus, many alternatives are appearing on the market, such as solid and semi-solid perfumes, several formulation types of which exist:

- concretes, opaque solid perfumes in the form of wax, whose touch is generally greasy, with a shiny appearance upon spread on the skin, or
- perfumes in the form of a gel composed either of silicones, which are less and less well perceived by consumers who are looking for ever more natural formulas, or of aqueous gelling agents and an aqueous phase which often generate a very sticky feel on the skin, some could even contain ethanol which dries the skin. Regardless of the formula, most solid and semi-solid perfumes on the market contain some synthetic ingredients, and are not totally natural, and in particular not COSMOS certified.

The document US 2006/110415 A1 is known in particular, among inter alia a highly perfumed silky gel whose composition comprises 15% of perfume, and several components allowing ensuring the silky gel form, including 20% of silicone elastomer, 22.8% of ethylhexyl hydroxystearate, 12% of trihydroxystearin, 10% of triethyl citrate and 20% of zeolite as well as preservatives. Although highly perfumed, this composition cannot be considered to be natural and in particular cannot be COSMOS certified.

It is even more difficult to offer solid or semi-solid perfumes containing a highly dosed perfume which is stable.

Hence, there is a need to provide a perfumed composition that solves all or part of these drawbacks.

SUMMARY OF THE INVENTION

To achieve this objective, according to one embodiment, a perfumed composition in a solid or semi-solid form is provided, characterised in that it comprises from 5 to 40% of perfume by weight of the total weight of the composition, from 10 to 15% of trihydroxystearin by weight of the total weight of the composition and preferably from 40% to 85% of a solvent by weight of the total weight of the composition, the solvent being preferably triethyl citrate. The composition is advantageously free of silicone and more specifically of silicone elastomer.

The invention provides a composition in a solid or semi-solid form which is highly concentrated in perfume and which is stable. In addition, trihydroxystearin, being a COSMOS-certified ingredient, ensures a perfumed composition that could be certified compliant with COSMOS, or with other certifications.

The composition according to the invention allows providing a solid or semi-solid composition advantageously intended to be extracted with the finger. Use is quick, easy and provides new sensory experiences through playful and original gestures. The use of the invention has practical advantages such as ease of transport, thanks to the absence of leakage risks or of limitation of the amount of liquid authorised in airplanes.

The solid or semi-solid form enables the use of easily transportable packaging with no storage problems.

Preferably, the perfumed composition is natural, even more preferably COSMOS-certifiable.

Surprisingly, the Applicant has obtained a highly perfumed composition that could be certified COSMOS stable with no silicone elastomer. Triethyl citrate in the proportions of the invention allows ensuring stability of the solid or semi-solid composition formed with the trihydroxystearin as well as a non-sticky effect. The effect of a non-sticky touch conferred by triethyl citrate has never been documented.

According to one possibility, the composition is free of ethanol and/or isopropanol and/or silicone and/or sulphates.

Thus, the use of a solid or semi-solid perfumed composition that is advantageously natural and COSMOS-certifiable, preferably alcohol-free and silicone-free, turns out to be a good alternative for consumers since it does not have the drawbacks related to ethanol and silicones, while being in line with the search for certified natural products.

Advantageously, the present invention is a solid or semi-solid fine perfumery perfume, preferably natural, COSMOS-certifiable, highly concentrated, advantageously alcohol-free and silicone-free. Thus, the perfume has improved sensory properties, such as a barely greasy and barely sticky feel, a viscosity close to a gel and stable over time.

Finally, the developed formula is compatible, irrespective of the selected perfume and olfactory family.

DETAILED DESCRIPTION

Before starting a detailed review of embodiments of the invention, optional features are set out hereinafter which could possibly be used in combination or alternatively:

According to one example, the composition is free of silicone, more specifically of silicone elastomer.

According to one example, the composition is free of alcohol, preferably ethanol and isopropanol, thereby avoiding the risks of irritations.

According to one example, the composition is wax-free, thereby ensuring a non-greasy touch, a non-shiny appearance when it is spread over the skin and a texture that is easy to pick up with the finger. More specifically, the composition is free of paraffin wax derived from petrochemicals, of animal wax, such as beeswax, of conventional vegetable waxes, such as soy wax because the touch is too greasy and they tend to oxidise quickly which might affect the olfactory stability of the product.

According to one example, the perfumed composition in a solid or semi-solid form is composed of 5 to 40% of perfume by weight of the total weight of the composition, of 10 to 15% of trihydroxystearin by weight of the total weight of the composition and of 45% to 85% of solvent, preferably triethyl citrate, by weight of the total weight of the composition.

According to one example, the perfume comprises a solvent different from triethyl citrate, the solvent of said composition.

According to one example, the solvent of the perfume is selected from at least one of glycerides, more specifically from among caprylic triglyceride or capric triglyceride.

According to another aspect, the invention relates to the use of the composition as described hereinabove for fine perfumery.

According to another aspect, the invention relates to the use of the composition as described hereinabove for cosmetics.

According to another aspect, the invention relates to the use of the composition as described hereinabove for hygiene products intended to be rinsed off, such as shower gels, shampoos, etc., or not, such as deodorisers, etc.

According to another aspect, the invention relates to the use of the composition as described hereinabove for home fragrances or indoor deodorisers or air fresheners.

By "compatible with any type of olfactory family", it should be understood that said composition may contain any type of perfume, from any olfactory family.

By "high perfume dosage", it should be understood that the composition may contain up to 20%, up to 30% and up to 40% by weight of perfume with respect to the total weight of the composition.

By "stable", it should be understood a composition which does not degrade over time and whose compounds will not react with each other. By "stable", it should be understood that the homogeneity, colouring, olfactory intensity, olfactory quality and viscosity of the composition are preserved. More particularly, the composition according to the present invention is stable under accelerated aging after 24 hours under UV light (Suntest) and after 2 months at 25° C. and 45° C. in comparison with a sample that has remained at 5° C., protected from light.

By "solid", it should be understood that the composition has a viscosity close to a hard balm, which could hold in a stick for example. Its dynamic viscosity at 20° C. is comprised between 50,000 cP and 100,000 cP. According to the present invention, the dynamic viscosity is measured with the HAAKE Viscotester IQ rheometer from Thermo Fischer Scientific at 20° C. Its melting point is comprised between 70° C. and 90° C. According to the present invention, the melting point is measured using the Kofler bench WAGNER & MUNZ Kofler heating bench System.

By "semi-solid", it should be understood that the composition has a viscosity close to a gel. By "having a viscosity close to that of a gel", it should be understood that the dynamic viscosity at 20° C. of said composition is comprised between 2,500 cP and 50,000 cP. According to the present invention, the dynamic viscosity is measured with the HAAKE Viscotester IQ rheometer from Thermo Fischer Scientific at 20° C. Its melting point is comprised between 50° C. and 70° C. According to the present invention, the melting temperature is measured using the Kofler bench WAGNER & MUNZ Kofler heating bench System.

By "ethanol-free" or "isopropanol-free", it should be understood a composition containing 0% by weight of ethyl alcohol or 0% by weight of isopropyl alcohol.

By "wax", it should be understood a substance whose properties are similar to those of beeswax, but which does not include paraffin waxes derived from petrochemicals, nor animal waxes such as beeswax, nor conventional vegetable waxes such as soy wax because the touch is too greasy and they tend to oxidise quickly, which might affect the olfactory stability of the product.

By "perfumed composition", it should be understood a composition comprising a mixture of perfuming substances, said perfuming substances being in the isolated state, in solution or in suspension, in their usual diluents, solvents or co-ingredients. Such a composition is intended to bring in a pleasant olfactory component.

By "pleasant odour", it should be understood an odour that is detected by the olfactory sense of the human being and which is perceived as pleasant.

By "perfume" or "perfuming substance", it should be understood one or several perfumed natural or synthetic raw material(s).

According to the invention, the perfumed composition comprises trihydroxystearin. The trihydroxystearin molecule is a lipophilic gelling agent allowing obtaining a semi-solid gel. It is a triester of glycerin and hydroxystearic acid derived to from castor oil with the following chemical formula, formula 1:

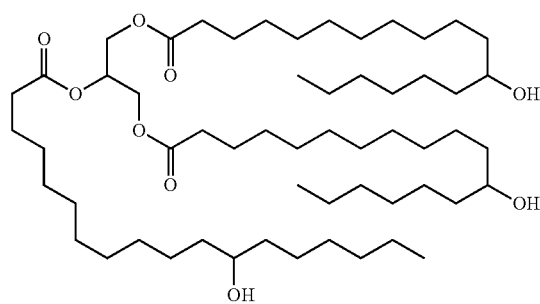

Formula 1

INCI: Trihydroxystearin
Chemical name: 1,2,3-propanetriyltris(12-hydroxy-octadecanoate)
Commercial name: Thixcin R
CAS number: 139-44-6

The use of this gelling agent allows obtaining a solid or semi-solid texture that could be removed with the finger.

Trihydroxystearin is colourless and odourless. From a regulatory perspective, it does not include a classification according to the Regulation (EC) No 1272/2008. According to the invention, the selection of the gelling agent has, surprisingly, allows formulating a composition that is highly concentrated in perfume while being in a stable solid or semi-solid form. Indeed, the high perfume concentrations conventionally have the effect of making solid or semi-solid formulations unstable. The perfume gas a tendency to damage the gelled structures and generates phase-shift or syneresis phenomena.

According to the invention, the perfumed composition comprises from 10 to 15% of trihydroxystearin by weight with respect to the total weight of the composition.

According to one embodiment, the perfumed composition comprises a solvent, advantageously triethyl citrate. Other solvents such as Caprylic/Capric triglyceride, octyldodecanol could also be used.

The triethyl citrate molecule is a solvent with medium spreading, and quite surprisingly a non-greasy touch. Its sensory properties make this product suitable as the main raw material in a semi-solid perfumed composition. Besides being a suitable emollient, this molecule has other advantages. Indeed, it is a colourless and odourless substance (does not modify the smell or the colour of the semi-solid perfume). This molecule also has deodorising properties, which makes this perfumed composition suitable for use as a body deodoriser. Indeed, it prevents the decomposition of sweat components.

It is a triester of citric acid with the chemical formula, formula 2:

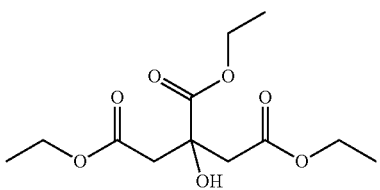

Formula 2

According to one embodiment of the invention, the perfuming composition comprises from 40% to 85% of triethyl citrate by weight with respect to the total weight of the composition. Advantageously, the amount of solvent, more specifically of triethyl citrate, is selected so as to complete the composition.

Preferably, the amount is high to ensure the indicated effect.

According to one possibility, the perfumed composition comprises additives. The additives are selected from among dyes, glitters, UV filters, antioxidants.

Preferably, the additives represent at most 5% by weight of the total weight of the composition.

Preferably, the composition according to the invention is free of ethanol and/or isopropanol.

Preferably, the composition according to the invention is free of silicone and more specifically of silicone elastomer. For example, silicone elastomers are dimethicones gelled with a cross polymer, mention may be made of Velvesil DM from Momentive, whose the composition comprises Dimethicone/Vinyl Dimethicone Crosspolymer and Dimethicone and Iso hexadecane and Cetearyl Methicone or else DOWSIL™ EL-8051 IN Silicone Organic Elastomer Blend from Dow Corning whose composition comprises Isodecyl Neopentanoate and Dimethicone/Bis Isobutyl PPG-20 Crosspolymer.

Preferably, the composition according to the invention is wax-free.

Furthermore, said composition developed by the present inventors is advantageous since it could be ethanol-free, stable, non-irritating to the skin, pleasant once applied to the skin, has sufficient hold and olfactory perception, and/or has improved sensory properties.

The perfume according to the invention may comprise natural or synthetic ingredients. The selection of this perfume depends on the one hand on the pursued odorous effect and on the other hand on the application in which it will be integrated.

According to one possibility, the perfumed composition comprises from 5 to 40% of perfume by weight with respect to the total weight of the composition.

According to a preferred embodiment, the perfume of the perfumed composition comprises a solvent different from the solvent of the perfumed composition. Thus, the perfume preferably comprises a solvent other than triethyl citrate. For example, the solvent of the perfume is selected from among glycerides, more specifically from caprylic triglyceride or capric triglyceride. The perfume solvent can be ethanol if a natural composition without alcohol is not desired. Advantageously, the solvent of the perfume is natural, preferably COSMOS-certifiable. The solvent may be castor oil, sweet almond oil, grapeseed oil, peanut oil, jojoba oil. Nonetheless, preferably, the solvent of the perfume is selected so as to avoid the risks of quickly becoming rancid and therefore of altering the olfactory stability of the perfume. Thus, preferably, the solvent is not a vegetable oil which could oxidise. Preferably, the solvent is not of the vegetable glycol type, for example pentylene glycol or monopropylene glycol or Butanediol, which have the disadvantage of not being compatible with some natural perfumery raw materials.

Whether natural or synthetic, such raw materials may comprise esters, ethers, alcohols, aldehydes, ketones, lactones, acetals, nitriles, phenols, acids, terpenes, heterocyclic nitrogen or sulphur compounds, saturated or unsaturated, and natural complex products.

Examples of esters comprise, but are not limited to, benzyl acetate, p-tert-butylcyclohexyl acetate, 3,7-dimethyl-1,6-octadien-3-yl acetate (linalyl acetate), dimethyl-benzyl-carbinyl acetate, phenylethyl acetate, 1,1-dimethyl-2-phenylethyl acetate, linalyl benzoate, ethyl-methyl-phenyl glycinate, allylcyclohexyl propionate, styralyl propionate, benzyl salicylate, methyl-3-oxo-2-pentylcyclopentane acetate, prop-2-enyl-2,3-methylbutoxy acetate (allyl amyl glycolate, 3-methylbutoxy-acetic acid 2-propenyl ester), acetic acid phenylmethyl ester, isoamyl acetate (isopentyl acetate), cis-hex-3-enyl acetate ((Z)-hex-3-enyl acetate), citronellyl acetate (3,7-dimethyl-6-octen-1-ol), hexyl acetate, isobornyl acetate (bicyclo[2.2.1]heptan-2-ol,1,7,7-trimethyl exo-acetate), methanyl acetate (alpha, alpha, 4-trimethylcyclohexylmethyl acetate), ethyl acetate, prenyl acetate (3-methyl-2-butenyl acetate), triethyl citrate, 4-ter-Butylcyclohexyl acetate, (3R-(3alpha,3abeta,6alpha,7beta,8aalpha))-Octahydro acetate-3,6,8,8-tetramethyl-1H-3a-7-methanoazulèen-5-yl, 3,7-Dimethyl octa-1,6-dien-3-yl acetate, 1,4-Dioxacyclohexadecane-5,16-Dione, Benzyl 2-Hydroxybenzoate, (Z)-3-Hexenyl-2-Hydroxybenzoate, 2-(1,1(Dimethylethyl)Cyclohexyl Acetate, Isopentyl Acetate, Methyl Phenylacetate, (Z)-Acetate Hex-3-enyl, 3,7-Dimethyl octa-1,6-diene-3-yl acetate, 3-Methyl-2-butenyl acetate, alpha-Methyl-Benzenemethanol acetate, methyl 2-aminobenzoate, 2-Propenyl-(cyclohexyloxy)acetate, methyl 2,4-dihydroxy-3,6-dimethylbenzoate, methyl 3-oxo-2-pentylcyclopentaneacetateethyl propanoate, 3-alpha,4,5,6,7,7-alpha-Hexahydro-4,7-methano-1H-inden-6-yl, methyl 3-oxo-2-pentylcyclopentaneacetate, Acetate 2-(1,1-Dimethylethyl)Cyclohexyl, hexyl-2-hydroxybenzoate (2-hydroxy-2-hexyl benzoic acid ester), 3a,4,5,6,7,7a-Hexahydro-4,7-methanoinden-acetate Ethyl 6-yl, 2-methyl butyrate, 3a,4,5,6,7,7a-Hexahydro-4,7-methano-1H-inden-5-yl, 2-methylpropanoate, Acetate of alpha, alpha-Dimethylphenethyl, 3,7-Dimethyl octa-1,6-diene-3-yl acetate, Exo-1,7,7-trimethyl-bicyclo[2.2.1]heptan-2-ol acetate, ethyl hexanoate, 3,7-Dimethyl octa-1,6-diene-3-yl acetate, methyl 3-oxo-2-pentylcyclopentaneacetate, Methyl 2-(methylamino)benzoate, 10-Undecenoic acid, ethyl ester, 2-methylpentanoate ethyl ester, cis-3,7-Dimethyl-2,6-octadienyl ethanoate, benzyl 2-hydroxybenzoate, (Z)-Hex-3-enyl acetate, benzoic acid 2-hydroxy-2-hexyl ester, prop-2-enyl-2-cyclohexyloxyacetate (2-Propenyl-(cyclohexyloxy)acetate), Acetic acid, (3-Methylbutoxy), 2-Propenyl ester, 2-Phenylethanol, Hexyl acetate, (1R,2S,5R)-5-Methyl-2-(1-methylethyl)-cyclohexanol ethanoate, terpenyl acetate (4-methyl-1-Propan-2-yl-1-cyclohex-2-enyl acetate), alpha-3,3-trimethylcyclohexyl-methyl formate, 3-methylbutyl butanoate (isoamyl butyrate), alpha-butanoate, alpha-dimethylphenethyl, 3-dihydrodicyclopentadien-2,3-yl acetate, prop-2-enyl, 3-cyclohexyl propanoate (allyl cyclohexane propionate), allyl heptanoate (2-propenyl heptanoate), 2-phenoxy-ethyl-methylpropanoate (phenoxy ethyl isobutyrate), ethyl 2-methylpentanoate, ethyl 2-methyl-butyrate (ethyl ester of 2-methyl-butanoic acid), 1,4-dioxacycloheptadecane-5,17-dione (Ethylene Brassylate), (2S)-2-propyl-1, 1-dimethylpropoxy ((2S)-Propyl ester of 2-(1,1-dimethylpropoxy acid) propanoate)-propanoic acid), 2-tert-butylcyclohexyl acetate (2-(1,1-dimethylethyl)cyclohexyl acetate), ci-3-hexenyl, [(1 S)-3-(4-methylpent-3-enyl)-1-cyclohex-3-enyl]methyl acetate, 3-pentyltetrahydro[2H]pyranyl acetate, linalyl propionate, cetyl acetate, cedryl acetate, anisyl acetate, nopyl acetate, neryl acetate, 3a,4,5,6,7,7a-hexahydro-4,7-methanoinden-6-yl acetate, 3a propanoate 2-propenyl, 4,5,6,7,7a-hexahydro-4,7-methano-1H-inden-6-yl, 3-cyclohexanepropanoate, 1,2-hydroxypropane-1,2,3-tricarboxylate, 2,3-triethyl, (2E)-3,7-dimethylocta-2,6-dien-1-yl acetate,3,5,5-trimethylhexyl, 3,7-dimethyl-octa-1,6-diene-3-yl acetate, cis-3,7-dimethyl-2,6-octadienyl ethanoate, tetradecanoic acid 1-methylethyl ester acid, 2-hydroxy-benzoic acid 3-methylbutyl ester, 2-hydroxy-benzoic acid phenylmethyl ester, 2-hydroxy-benzoic acid 2-hexyl ester, 2-Hydroxy-Benzoic acid methyl ester, acetoacetic acid ethyl ester, 3,7-dimethyl-octa-1,6-dien-3-yl acetate, 1,2-benzenedicarboxylic acid 1,2-diethyl ester, (Z)-hex-3-enyl 2-methylpropanoate, (4-methyl-1-propan-2-yl-1-cyclohex-2-enyl) acetate, 3a,4,5,6,7 acetate, 7a-hexahydro-4,7-methanoinden-6-yl, ethyl 2,3-epoxy-3-phenylbutyrate, methyl 2-aminobenzoate, methyl 2-(methylamino)benzoate, methyl benzoate, 2,4-methyl dihydroxy-3,6-dimethylbenzoate, acetate (3R-(3alpha,3beta,6beta,7beta,8alpha))-octahydro-6-methoxy-3,6,8,8-tetramethyl-1H-3a,7-methanoazulene, hexyl salicylate, 4-tert-butylcyclohexyl) acetate, methyl palmitate, 1,6-octadien-3-ol, 3,7-dimethyl-acetate and triethyl citrate. Preferably, examples of esters comprise linalyl propionate, cetyl acetate, cedaryl acetate, anisyl acetate, nopyl acetate, neryl acetate, (3R-(3alpha, 3beta, 6beta, 7beta, 8alpha))-octahydro-6-methoxy-3,6,8,8-tetramethyl-1H-3a,7-methanoazulene acetate, hexyl salicylate, 4-tert-butylcyclohexyl)acetate, methyl palmitate, 1,6-Octadien-3-ol, 3,7-dimethyl-acetate, linalyl acetate and triethyl citrate.

Examples of ethers comprise, but are not limited to, benzyl ether, ethyl ether, ambergris, diphenyl ether, 4,6,6,7, 8,8-hexamethyl-1,3,4, 6,7,8-hexahydrocyclopenta[g]isochromene, carane amber, 1,1-dimethoxy-2,2,5-trimethyl-4-hexene, 3,4,4a,5,8,8a-Hexahydro-3', 7'-dimethylspiro(1,4-methanonaphthalene-2(1H),2'-oxirane), 2,4,6-Trimethyl-4-phenyl-1,3-dioxane, Benzene, 1,1'-Oxybis, Methyl 2-naphthyl ether, ethyl 2-naphthyl ether, 2,4-Di methyl-4-phenyltetrahydrofuran, (ethoxymethoxy)cyclododecane, (E)-1-methoxy-4-(1-propenyl)-benzene, 1-methoxy-4-(2-propenyl)-benzene, Methyl cedaryl ether and ethyl 2-naphthyl ether. Preferably, examples of ethers comprise 1,1-dimethoxy-2,2,5-trimethyl-4-hexene, methyl cedaryl ether and ethyl 2-naphthyl ether.

Examples of alcohols comprise, but are not limited to, menthol ([1R-(1alpha,2beta,5alpha)]-5-methyl-2-isopropylcyclohexanol), citronellol, geraniol, linalool (For example ethyl linalool and tetrahydro linalool), phenylethyl alcohol, terpineol, 2,6-dimethylheptan-2-ol, 2-methyl-1-phenylpropan-2-ol (di-methyl phenyl carbinol), 3-methyl-5-[2,2,3-trimethylcyclopent-3-en-1-yl]pent-4-en-2-ol, 2-phenylethanol, 2-ethyl-4-(2,2,3-trimethyl-1-cyclopent-3-enyl)but-2-en-1-ol, (E)-4-methyldec-3-en-5-ol, cinnamic alcohol (3-phenyl-2-propen-1-ol), 3,7-Dimethyl-6-octen-1-ol, p-menth-1-en-8-ol, cis-Hex-3-en-1-ol, 4-Methyl-3-decen-5-ol, 2,6-dimethyloct-7-en-2-ol, 1,1'-Oxydipropan-2-ol, 3,7-Dimethyl-1,6-nonadien-3-ol, 1,1'-Oxydipropan-2-ol, 2,6-dimethyloct-7-en-2-ol 3,7-Dimethyl octa-1,6-diene-3-ol, 2-ethyl-4-(2,2,3-trimethyl-3-cyclopenten-1-yl)-2-buten-1-ol, phenylmethanol, 4-Methyl-3-decen-5-ol, 2,6-Dimethyl-octan-2-ol, 3,7-Dimethyl-6-octen-1-ol, 4-(1,1-dimethylethyl)-Cyclohexanol, (2E)-3,7-dimethyl-2,6-Octadien-1-ol, Hexan-1-ol, exo-1,7,7-Tri methyl bicyclo[2.2.1]heptan-2-ol, 2-(2,2,7,7-tetramethyltricyclo[6.2.1.0 (1,6)]undec-5(4)-en-5-yl)propan-1-ol, 1-Phenylethanol, 1,1'-Oxydipropan-2-ol, 3,7-Dimethyloctan-3-ol, cis-3,7-Dimethyl-2.6-octadien-1-ol, 3,7-Dimethyl-6-octen-1-ol, Hex-2-en-1-ol, 3,7-Dimethyl octa-1.6-diene-3-ol, 2-Methyl-4-phenylbutan-2-ol, 2,6-Octadien-1-ol, 3,7-dimethyl-, (2E)-, p-menth-1-en-8-ol, 3-Phenylpropan-1-ol, phenylmethanol, 2,6-dimethyloct-7-en-2-ol, alpha,beta,2,2,3-pentamethylcyclopent-3-ene-1-butanol, 3-(5,5,6-trimethylbicyclo[2.2.1]hept-2-yl)cyclohexan-1-ol (IBCH), cis-3-hexen-1-ol, methyl-trimethylbicyclo-hexylmethyl-cyclopropyl methanol benzyl alcohol, endo-1,7,7-trimethyl-bicyclo-[2.2.1]heptan-2-ol, 3,7-dimethyl-6-octen-1-ol, 3, 7-dimethyl-1-octanol, (2E)-3,7-dimethyl-2,6-octadien-1-ol, cis-3,7-dimethyl-2,6-octadien-1-ol, 3,7-dimethyl-octa-1,6-dien-3-ol, 2-(4-methyl-1-cyclohex-3-enyl)propan-2-ol, 4-methyl-1-(1-methylethyl)-3-cyclohexen-1-ol, (1R, 2S, 5R)-5-methyl-2-(1-methylethyl)-cyclohexanol, (2E)-3,7-dimethyl-2,6-octadien-1-ol and 3-methylbutan-1-ol. Preferably, examples of alcohols comprise alpha,beta,2,2,3-pentamethylcyclopent-3-ene-1-butanol, 3-(5,5,6-trimethylbicyclo[2.2.1]hept-2-yl) cyclohexan-1-ol (IBCH), cis-3-hexenol, methyl-trimethylbicyclohexylmethyl-cyclopropyl methanol, 3-methylbutan-1-ol, ethyl linalool, tetrahydro linalool and [1R-(1 alpha, 2beta, 5alpha)]-5-methyl-2-isopropylcyclohexanol (menthol). Examples of aldehydes comprise, but are not limited to, linear alkanals comprising between 8 and 18 carbon atoms, 3,7-Dimethyl-2,6-octadienal (citral), citronellal, Cyclamen aldehyde, hydroxycitronellal, 3,7-Dimethyl-2,6-octadienal, Undecanal, alpha-methyl-4-(1-methylethyl)-Benzenepropanal, 3-(4-isopropylphenyl)-2-methylpropanal, 2,4-dimethylcyclohex-3-ene-1-carbaldehyde, 2,4-dimethylcyclohex-3-ene-1-carbaldehyde, (2E)-2-Dodecenal, Octanal, Lauryl aldehyde, Nonanal, (E)-2-Benzylideneoctanal, 2,4-dimethylcyclohex-3-ene-1-carbaldehyde, 3-(4-ethylphenyl)-2,2-dimethylpropanal, 4-Hydroxy-3-methoxybenzaldehyde, 3-(4-tert-butylphenyl)-2-methylpropanal, 3-(4-tert-butylphenyl) propanal, 2, 6, 10-trimethylundec-9-enal, 4(octahydro-4,7-methano[5H]inden-5-ylidene)butanal, 3-(3-propan-2-ylphenyl)butanal, 7-hydroxy-3,7-dimethyloctanal (hydroxycitronellal, 3,7-dimethyl-7-hydroxy-octane-1-al), 4-(4-hydroxy-4-methylpentyl)cyclohex-3-ene-1-carbaldehyde, octahydro-5-methoxy-4,7-Methano-1H-indene-2-carboxaldehyde, alpha-methyl cinnamic aldehyde (2-methyl-3-phenyl-2-propenal), 4-methoxybenzaldehyde (anisic aldehyde), C10 aldehyde (decanal), undec-10-enal, C12 aldehyde (lauric or dodecanal), methyl-nonyl acetaldehyde (2-methylundecanal), C16 aldehyde, C6 aldehyde (hexanal), cinnamic aldehyde (3-phenyl-2-propenal), 3-ethoxy-4-hydroxybenzaldehyde (Ethylvanillin), cinnamic hexyl aldehyde (2-benzylideneheptanal), 3-phenylbutanal (3-phenylbutyraldehyde), 2,4-dimethylcyclohex-3-ene-1-carbaldehyde, 5-heptanal, 2,6-dimethylhept-5-enal, 4-hydroxy-3-methoxybenzaldehyde (Vanillin), alpha-methyl-1,3-benzodioxole-5-propionaldehyde, 4-isopropylbenzaldehyde, 3,7-dimethyl-6-octenal, 3,7-dimethyl-2,6-octadienal, 4-(4-hydroxy-4-methylpentyl)-3-cyclohexene-1-carboxaldehyde, trans-hex-2-enal, 2,4,6-trimethyl-3- cyclohexene-1-carboxaldehyde, 2-(4-tert-butylbenzyl) propionaldehyde and benzaldehyde. Preferably, examples of aldehydes comprise 2,4-dimethylcyclohex-3-ene-1-carbaldehyde, 5-heptanal, 2,6-dimethyl-hept-5-enal,4-hydroxy-3-methoxybenzaldehyde (Vanillin), alpha-methyl-1,3-benzodioxole-5-propionaldehyde, citral and benzaldehyde.

Examples of ketones comprise, but are not limited to, ionones, isomethylionone, methyl cedaryl, (E)-1-(2,6,6-trimethyl-1-cyclohex-2-enyl)but-2-en-1-one (alpha-damascone), 3-methyl-2-[(2Z)-pent-2-en-1-yl]cyclopent-2-en-1-one (cis-jasmone), 4-(4-methoxyphenyl)-butan-2-one, 4(3)-(4-methylpent-3-enyl)cyclohex-3-enecarbaldehyde, 1-(1,2,3,4,5,6,7,8-octahydro-2,3,8,8-tetramethyl-2-naphthalenyl) ethanone, 3-Methyl-4-(2,6,6-trimethyl-2-cyclohexenyl)-3-buten-2-one, (E)-4-(2,6,6-trimethyl-1-cyclohexen-1-yl)-3-buten-2-one, E)-4-(2,6,6-trimethylcyclohex-2-eneyl)-but-3-en-2-one, 7-Methyl-2H-benzo-1,5-dioxepin-3(4H)-one, 1-(2,6,6-Trimethyl-1,3-cyclohexadienyl)-2-buten-1-one, Methyl hydroxypyrone, 2,2,5-Trimethyl-5-pentylcyclopentan-1-one, 1-(5,5-Dimethyl-1-cyclohexenyl)pent-4-en-1-one, 3-Methyl-4-(2,6,6-trimethyl-2-cyclohexenyl)-3-buten-2-one, 2-[2-(4-Methyl-3-cyclohexen-1-yl)propyl]-cyclopentanone, 1-(1,2,3,4,5,6,7,8-octahydro-2,3,8,8-tetramethyl-2-naphthalenyl)ethanone, (E)-4-(2,6,6-trimethyl-1-cyclohexen-1-yl)-3-buten-2-one, 4-Phenylbutan-2-one 2-Cyclohexyl-1,6-heptadien-3-one, 1-(5,5-Dimethyl-1-cyclohexenyl)pent-4-en-1-one, 2-Buten-1-one, 1-(2,6,6-trimethyl-3-cyclohexen-1-yl)-, 2H-1-Benzopyran-2-one, 1-spiro(4.5)-7-decen-7-yl-4-penten-1-one and 1-spiro(4.5)-6-decen-7-yl-4-penten-1-one, (E)1-(2,6,6-Trimethyl-2-cyclohexen-1-yl)-2-buten-1-one, (E)-4-(2,6,6-trimethyl-1-cyclohexen-1-yl)-3-buten-2-one, Dihydro-5-pentyl-2(3H)-furanone, 2,2,5-Trimethyl-5-pentylcyclopentan-1-one, 1-(1,2,3,4,5,6,7,8-octahydro-2,3,8,8-tetramethyl-2-naphthalenyl) ethanone, ce-dryl methyl ketone, 7-methylbenzo[b][1,4] dioxepin-3-one, 1,7,7-trimethylbicyclo[2,2,1]heptan-2-one, 1-benzopyrane-2-one (Coumarin), 1-(2,6,6-trimethyl-1-cyclohex-3-enyl)but-2-en-1-one, butan-2,3-dione (Diacetyle), 1-(1,2,3,4,5,6,7,8-octahydro-2,3,8,8,-tetramethyl-2-naphthyl)ethan-1-one, irons, 1-(2-naphthalenyl)ethanone (2-acetonaphthone), menthone, carvone, 3-methyl-2-pentyl-2-cyclopentenone, 1-(2,6,6-trimethyl-3-cyclohexen-1-yl)-2-buten-1-one, 1-(2,6,6-trimethyl-2-cyclohexenyl)hepta-1,6-dien-3-one, 2-ethyl-3-hydroxy-4H-pyran-4-one, (5R)-2-methyl-5-prop-1-en-2-ylcyclohex-2-en-1-one, 1-(6-tert-butyl-1,1-dimethyl-2,3-dihydro-1H-inden-4-yl)ethanone, 1-(5,6,7,8-tetrahydro-3,5,5,6,8,8-hexamethyl-2-naphthyl) ethan-1-one, 4-(2,6,6-trimethylcyclohex-2-enyl)-but-3-ene-2-one, octan-2-one, 1-(1,2,3,4,5,6,7,8-Octahydro-2,3,8,8-Te-tramethyl-2-Napthyl)Ethan-1-one and 1,3,4,6,7,8a-Hexahydro-1,1,5,5-tetramethyl-2H-2,4a-methanonaphthalen-8(5H)-one. Preferably, examples of ketones comprise the irons, 1-(2-naphthalenyl)ethanone (2-acetonaphthone), menthone, carvone, 3-methyl-2-pentyl-2-cyclopentenone, 1-(1,2,3,4,5,6,7,8-Octahydro-2,3,8,8-Te-tramethyl-2-Napthyl)Ethan-1-one and 1,3,4,6,7,8a-Hexahydro-1,1,5,5-tetramethyl-2H-2,4a-methanonaphthalen-8 (5H)-one.

Examples of lactones comprise, but are not limited to gamma decalactone (decan-4-olide), Decan-5-olide, Decan-4-olide, Undecan-4-olide, gamma undecalactone (undecan-4-olide), cis-jasmone lactone, gamma undecalactone, delta octalacone, delta decalactone and hexahydro-3,6-dimethyl-2(3H)-benzofuranone. Preferably, examples of lactones comprise gamma undecalactone, delta octalacone, delta decalactone and hexahydro-3,6-dimethyl-2(3H)-benzofuranone.

Examples of acetals comprise, but are not limited to, 2,4-dimethyltetrahydroindedioxine, diacetal of phenylacetic aldehyde, phenylacetaldehyde glyceryl acetal, citral diethyl acetal, citral dimethyl acetal, 2,6-octadienal, 1,1-dimethoxy-2-phenylethane and isomerised 3,7-dimethyl acid. Preferably, examples of acetals comprise phenylacetaldehyde glyceryl acetal, citral diethyl acetal, citral dimethyl acetal, 2,6-octadienal and isomerised 3,7-dimethyl acid.

Examples of nitriles comprise, but are not limited to, 3,7-dimethyloct-6-ene nitrile (citronellyl nitrile), tridec-2-enenitrile, 3-phenyl-2-propenenitrile, 3,7-Dimethyl-6-enenitrile, dodecanenitrile and 3,7-dimethylnona-2,6-dienenitrile. Preferably, examples of nitriles comprise tridec-2-enenitrile, 3-phenyl-2-propenenitrile, dodecanenitrile and 3,7-dimethylnona-2,6-diennitrile.

Examples of phenols comprise, but are not limited to, eugenol (2-methoxy-4-(2-propenyl)-phenol), iso-eugenol, 5-methyl-2-(1-methylethyl)-phenol, 2-ethoxy-4-methylphenol, 2-isopropyl-5-methylphenol, 5-methyl-2-(1-methylethyl)-Phenol, 2,6-di-tert-butyl-p-cresol and 2-ethoxy-4-(methoxymethyl)-phenol.

Examples of acids comprise, but are not limited to, pentanoic acid, butyric acid, and 2-methylpent-2-en-1-oic acid.

Examples of terpenes such as cyclic (For example sesquiterpene) or non-cyclic terpene hydrocarbons, comprise, but are not limited to, limonene, 1-methyl-4-isopropenyl-1-cyclohexene, 1-methyl-4-isopropyl-1,4-cyclohexadiene, 7-methyl-3-methyleneocta-1,6-diene, 1-methyl-4-(1-methylethyl)-1,3-cyclohexadiene, 2,6,6-trimethylbicyclo[3.1.1] hept-2-ene, 6,6-dimethyl-2-methylenebicyclo[3.1.1]heptane, 2,2-dimethyl-3-methylenebicyclo-[2.2.1]-heptane, (3R-(3alpha,3abeta,6beta,7beta,8aalpha))-Octahydro-6-methoxy-3,6,8,8-tetramethyl-1H-3a,7-methanoazulene, 4,11,11-trimethyl-8-methylene-(1R,4E,9S)-Bicyclo[7.2.0] undec-4-ene, [1R,(1R*,4E,9S*)]-4,11,11-trimethyl-8-methylene-bicyclo[7.2.0]undec-4-ene, 1-methyl-4-(1-methylethyl)benzene and sesquiterpene essential oils. Preferably, examples of terpenes comprise sesquiterpene essential oils.

Examples of heterocyclic nitrogen or sulphur compounds, saturated or unsaturated, comprise, but are not limited to, indole, 1,3-benzopyrrole, tetrahydro-4-methyl-2-(2-methyl-1-propenyl)-2H-pyran, 2-methyl-pyrazine, 4-methyl-5-hydroxyethyl thiazole (2-(4-methylthiazol-5-yl)ethanol), 6-tert-butylquinoline, 6-(isopropyl)quinoline, (3aR-(3aalpha,5abeta,9aalpha,9bbeta))-Dodecahydro-3a,6,6,9a-tetramethylnaphtho(2,1-b)furan,2-Isopropyl-4-methyl-1.3-thiazole, cis-2-methyl-4-propyl-1,3-oxathiane, 6(8)-(1-Methylpropyl)quinoline and pyrazines. Preferably, examples of heterocyclic nitrogenous or sulphur compounds, saturated or unsaturated, comprise 6-tert-butylquinoline, 6-(isopropyl)quinoline, cis-2-methyl-4-propyl-1.3-oxathiane, 6(8)-(1-Methylpropyl)Quinoline and pyrazines.

Examples of natural complex products comprise, but are not limited to, essential oils extracted from the different portions of plants (flowers, stems, leaves, fruits, barks, roots, woody portions, grasses, needles, sap and gums), resinoids, concretes, or absolutes obtained from the latter. Preferably, examples of natural complex products comprise *Artemisia herba-alba* oil, *Pogostemon cablin* leaf oil, *Citrus nobilis* peel oil, *Barosma betulina* leaf extract, *Citrus limon* peel extract, *Eucalyptus globulus* leaf oil, *Dipterocarpus turbinatus* balsam oil, *Pogostemon cablin* leaf oil, *Rosmarinus officinalis* leaf oil, *Juniperus virginiana* oil, Field mint (*Mentha arvensis*) leaf oil, Spearmint (*Mentha viridis*) leaf oil, *Citrus aurantium dulcis* bark Oil, *Citrus aurantium dulcis* bark Extract, Mediterranean Cypress (*Cupressus sempervirens*) leaf oil, Patchouli (*Pogostemon cablin*) leaf oil, Texas Cedar (*Junipe-rus mexicana*) and Hybrid *Lavandula* (*Lavandula hybrida*) oil. The perfumed composition is adapted to be packaged in many types of packaging adapted to receive a solid or semi-solid composition. As a non-limiting example, pots, brushes with reservoirs, tubes with an endpiece, in particular made of plastic, sticks.

The composition according to the present invention should be prepared by heating up the ingredients, then by dispersing the trihydroxystearin under stirring. The embodiments detailed hereinabove could be easily combined together in a non-limiting manner.

EXAMPLES

Example 1: Perfumed Composition No. 1

The components of the perfumed composition No. 1, described in Table 1, are mixed in order to obtain the perfumed composition No. 1.
Table 1

TABLE 1

| Component | INCI name | % By weight Amount |
|---|---|---|
| Perfume 1 | Perfume | 20.00% |
| Solvent | Triethyl citrate | 70.00% |
| Gelling agent | trihydroxystearin | 10.00% |

The components of the perfume 1, hereinafter, are mixed in order to obtain the perfume 1.
IUPAC Name
- 4-Hydroxy-3-methoxybenzaldehyde
- (3Z)-3-Hexen-1-ol
- 2-Methoxy-4-[(1E)-1-propen-1-yl]phenyl 2-methylpropanoate
- Hexanal
- (3E)-4-(2,6,6-Trimethyl-1-cyclohexen-1-yl)-3-buten-2-one
- Orange peel oil (*Citrus dulcis*)
- Ho wood oil (*Cinnamomum camphora* linalooliferum)
- 2,6-Dimethyl-5-heptenal
- 3-Methylbutyl 2-methylpropanoate
- (3Z)-3-Hexen-1-yl acetate
- Ethyl butanoate
- Ethyl acetate
- Ethyl 2-methylbutanoate
- Ethyl hexanoate
- 5-Heptyldihydro-2(3H)-furanone
- (2E)-3,7-Dimethyl-2,6-octadien-1-yl acetate
- Hexyl acetate
- Glycerides, a mixture of decanoyl and octanoyl Example 2: Perfumed Composition No. 2

The components of the perfumed composition No. 2, described in Table 2, are mixed in order to obtain perfumed composition No. 2.

Table 2

TABLE 2

| Component | INCI name | % By weight Amount |
|---|---|---|
| Perfume 1 | Perfume | 5.00% |
| Solvent | Triethyl citrate | 85.00% |
| Gelling agent | trihydroxystearin | 10.00% |

Example 3: Perfumed Composition No. 3

The components of the perfumed composition No. 3, described in Table 3, are mixed in order to obtain the perfumed composition No. 3.
Table 3

TABLE 3

| Component | INCI name | % By weight Amount |
|---|---|---|
| Perfume 1 | Perfume | 40.00% |
| Solvent | Triethyl citrate | 50.00% |
| Gelling agent | trihydroxystearin | 10.00% |

Example 4: Perfumed Composition No. 4

The components of the perfumed composition No. 4, described in Table 4, are mixed in order to obtain the perfumed composition No. 4.
Table 4

TABLE 4

| Component | INCI name | % By weight Amount |
|---|---|---|
| Perfume 1 | Perfume | 25.00% |
| Solvent | Triethyl citrate | 60.00% |
| Gelling agent | trihydroxystearin | 15.00% |

Example 5: Stability of the Perfumed Compositions

The perfumed compositions 1, 2, 3, 4 have been tested under each of the conditions in the table hereinbelow to verify the stability of the perfumed compositions.
Table 5

TABLE 5

| Conditions of the tests | Duration before reading |
|---|---|
| UV | 24 h |
| 5° C. | 15 days |
| | 1 month |
| | 2 months |
| Ambient temperature (AT) | 15 days |
| −25° C. | 1 month |
| | 2 months |
| 45° C. | |
| | 1 month |
| | 2 months |

The UV test, also called "Sun test", is used to simulate the effects of sunlight. This test lasts 24 hours, under a Xenon lamp, under a long wavelength of 420 nm, with an irradiance of 0.62 W/m$^2$.

All of the perfumed compositions No. 1 to 4 are stable under all of the test conditions of Table 5. More particularly, perfumed compositions No. 1 to 4 are stable under accelerated aging after 24 hours under UV light (Suntest) and after 2 months at 25° C. and 45° C. in comparison with a sample left at 5° C., away from light.

Example 6: Adaptation of the Composition of the Document US2006/110415

The composition of the document US2006/110415 has been replicated while re-moving the silicone elastomer and increasing the amount of triethyl citrate.

| Chemical name | % w/w |
| --- | --- |
| Ethylhexyl Hydroxystearate | 22.80 |
| Trihydroxystearin | 12.00 |
| Triethyl citrate | 30.00 |
| Preservative | 0.20 |
| Zeolite | 20.00 |
| Perfume | 15.00 |

The obtained formula does not allow obtaining a silky touch, the feel is rough, difficult to spread. It seems necessary in this formula to keep the silicones to obtain a satisfactory touch.

Example 7: Adaptation of the Perfumed Composition According to the Invention, Wherein Part of the Triethyl Citrate has been Replaced with the Ethylhexyl Hydroxystearate of the Document US2006/110415

10% of triethyl citrate has been retained in this example, an amount equivalent to that mentioned in Example 17 of the document US2006/110415.

| Chemical name | % w/w |
| --- | --- |
| Ethylhexyl Hydroxystearate | 60.00 |
| Trihydroxystearin | 10.00 |
| Triethyl citrate | 10.00 |
| Perfume | 20.00 |

It has been possible to observe syneresis at 45° C. and 50° C. after only 6 days. In contrast with what has been mentioned in paragraph 35 of the document US 2006/110415, ethylhexyl hydroxystearate does not form a stable gel in combination with trihydroxystearin if a silicone elastomer is not also used. In addition, the obtained touch is rich, greasy, thick, and not dry. Hence, ethylhexyl hydroxystearate does not allow obtaining a dry touch if a silicone and more specifically a silicone elastomer is not also used.

Example 8—Olfactory Stability Test of a Composition According to the Document US2066/110415

The Applicant has carried out stability tests on the formula of Example 17 of the document US 2006/110415 with a perfume (oriental rose NatCO), the olfactory pyramid of which is reported herein:

| Top note | Ylang-ylang | Bergamot | Mandarin |
| --- | --- | --- | --- |
| Middle note | Rose | Geranium | Iris |
| Base note | Tonka bean | Benjoin Siam | Santal |

After 6 days at 45° C., a strong deviation from the pink note, towards a green and seaweed note, has been observed. Hence, it seems that the formula of Example 17 of the document US 2006/110415 is sensitive to the oxidation phenomenon, in particular by the presence of ethylhexyl hydroxystearate.

Example 9—Test of Stability and Olfactory Stability of a Composition According to the Invention This test has been carried out with the oriental rose perfume NatCO composed of triethyl citrate as a solvent.

| Chemical name | % w/w |
| --- | --- |
| Triethyl citrate | 70.00 |
| Trihydroxystearin | 10.00 |
| Perfume | 20.00 |

A syneresis is rapidly observed at room temperature as well as heat shrinkage after only 6 days.

Conversely, the use of the same oriental rose perfume NatCO composed of Caprylic/Capric triglyceride as a solvent in a formulation as hereinabove allows obtaining a stable product without any syneresis or olfactory deviation problem. In addition, the obtained touch is very satisfactory, herein again due to the strong presence of triethyl citrate in the formula.

We have also carried out stability tests on this formula and we have not observed any olfactory deviation. Indeed, the used solvents are very stable with regards to oxidation phenomena.

The invention is not limited to the previously-described embodiments and extends to all of the covered embodiments and uses of the invention.

The invention claimed is:

1. A perfumed composition in a solid or semi-solid form, comprising from 5 to 40% of perfume by weight of the total weight of the perfumed composition, from 10 to 15% of the trihydroxystearin by weight of the total weight of the perfumed composition and from 40% to 85% of a solvent by weight of the total weight of the perfumed composition, the solvent comprising triethyl citrate, the composition being free of silicone and silicone elastomer.

2. The composition according to claim 1, free of alcohol.

3. The composition according to claim 1, free of paraffin wax, animal wax and vegetable wax.

4. The perfumed composition in a solid or semi-solid form according to claim 1, consisting of 5 to 40% of perfume by weight of the total weight of the perfumed composition, of 10 to 15% of trihydroxystearin by weight of the total weight of the perfumed composition and of 45% to 85% of a solvent, by weight of the total weight of the perfumed composition.

5. The perfumed composition in a solid or semi-solid form according to claim 1, wherein the perfume further comprises a solvent different from triethyl citrate.

6. The perfumed composition in a solid or semi-solid form according to claim 5, wherein the solvent different from triethyl citrate is selected from at least one of glycerides.

7. The composition according to claim 1, for cosmetics.

8. The composition according to claim 1, for hygiene products intended to be rinsed off.

9. The composition according to claim 1, for home fragrances or indoor deodorisers or air fresheners.

10. The composition according to claim 1, for hygiene products intended to not be rinsed off.

11. The composition according to claim 1 free of ethanol and isopropanol.

12. The perfumed composition according to claim 6, wherein the solvent for the perfume is selected from among caprylic triglyceride or capric triglyceride.

13. A fine perfume comprising the perfumed composition according to claim 1.

14. A perfumed composition in a solid or semi-solid form, comprising from 5 to 30% of perfume by weight of the total weight of the perfumed composition, from 10 to 15% of the trihydroxystearin by weight of the total weight of the perfumed composition, and from 60% to 85% of the solvent by weight of the total weight of the perfumed composition, the solvent being triethyl citrate, the composition being free of silicone and silicone elastomer.

* * * * *